Jan. 6, 1942.  R. L. BARRISH  2,269,351
MECHANICAL MOVEMENT
Filed Sept. 20, 1940  2 Sheets—Sheet 1
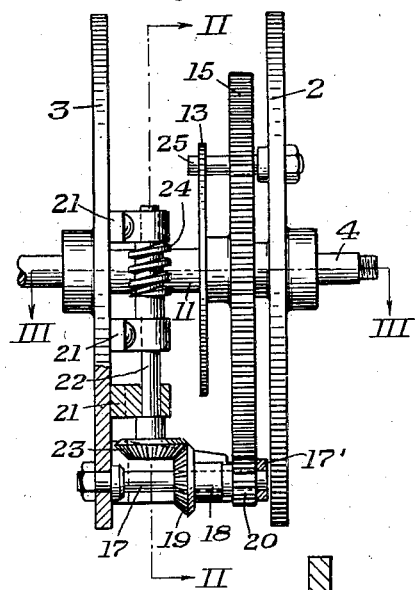
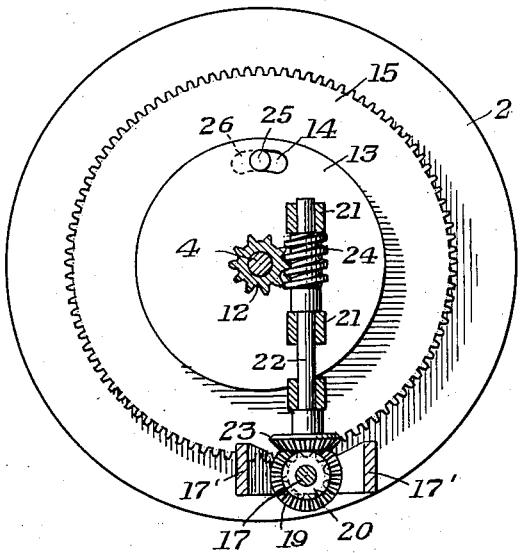
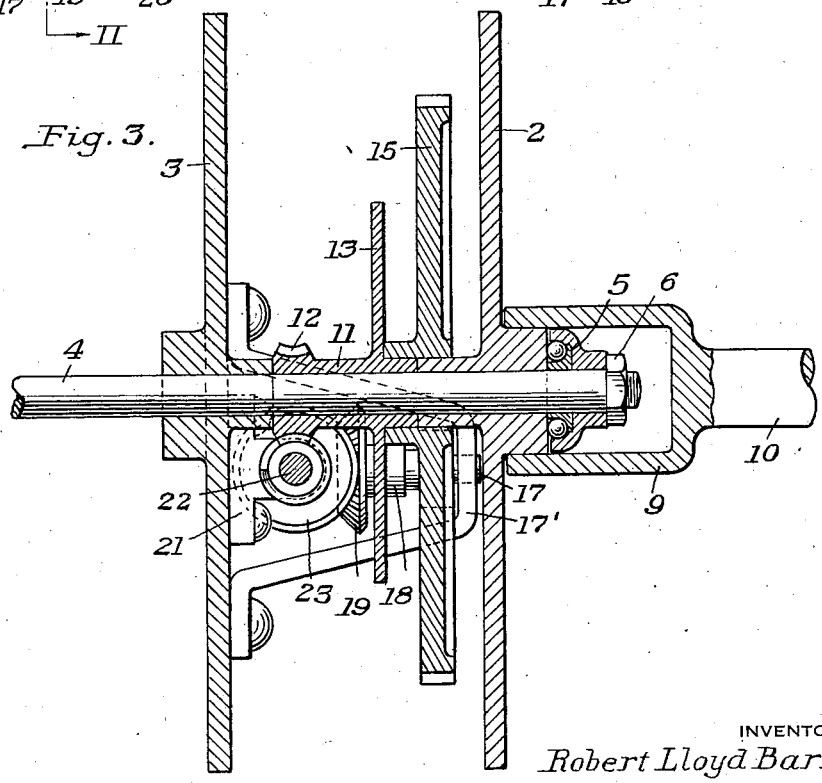
INVENTOR
Robert Lloyd Barrish Jan. 6, 1942.    R. L. BARRISH    2,269,351
MECHANICAL MOVEMENT
Filed Sept. 20, 1940    2 Sheets-Sheet 2
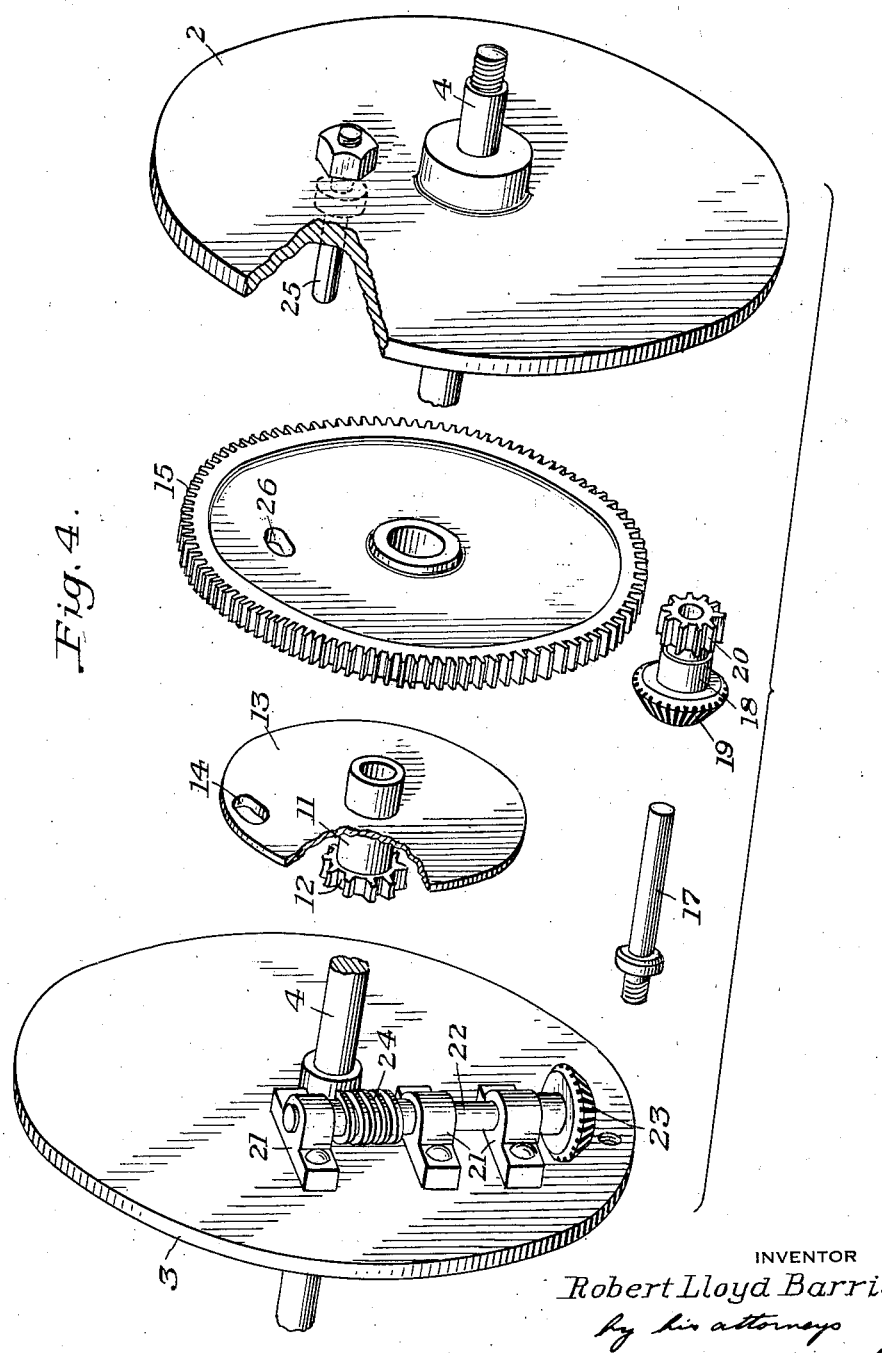
INVENTOR
Robert Lloyd Barrish Patented Jan. 6, 1942

2,269,351

UNITED STATES PATENT OFFICE 2,269,351

MECHANICAL MOVEMENT

Robert Lloyd Barrish, Pittsburgh, Pa.

Application September 20, 1940, Serial No. 357,581

10 Claims. (Cl. 74—280)

This invention is for an improvement in mechanical movements and is for a mechanism for transmitting rotational motion in one direction only. Many mechanisms have been devised for transmitting rotational movement in one direction only, but all of them require the use of pawls and ratchets or the use of various kinds of friction clutches, including most frequently various types of wedging ball arrangements. Ratchet mechanisms permit some relative movement between the parts before the pawl cooperates with the ratchet to become effective. In many cases this slight relative movement in the reverse direction is objectionable. Pawl and ratchet mechanisms also depend on springs, counterweights, or centrifugal force for keeping the pawl in engagement with the ratchet and in many cases this is objectionable and is often the cause of failure of one of these mechanisms to operate.

Mechanisms employing friction balls and other friction surfaces are subject to rapid wear, and as the wear in the parts increases, the amount of free reverse movement which may take place increases. There is also a tendency in many instances for mechanisms of this kind to bind, particularly when the parts become worn and difficulty is encountered in releasing them.

According to the present invention there is provided a mechanism which may be used in any place where a pawl and ratchet may be used or in any mechanism where friction clutches for producing the uni-directional transmission of motion is employed, but wherein all of the parts are in positive mechanical relation at all times through gearing, and wherein ratchets or like mechanical elements or friction balls or other friction parts are avoided. The mechanism provides a unique arrangement wherein there is at all times a permanent geared connection between the driving and the driven parts.

My invention may be readily understood by reference to the accompanying drawings in which one embodiment of the invention is illustrated, and it will be understood that these drawings are for the purpose of illustrating the nature of the mechanical movement involved and that the parts may be variously constructed and embodied within the broad contemplation of my invention.

In the drawings—

Figure 1 is a side elevation of a mechanism embodying my invention, certain parts, however, being shown in section to more clearly show the construction of the parts;

Figure 2 is a transverse section through the mechanism shown in Figure 1 in substantially the plane of line II—II of Figure 1;

Figure 3 is a longitudinal section in the plane of line III—III of Figure 1;

Figure 4 is an exploded view showing the several parts comprising the mechanism in the relation which they occupy in the assembled unit but separated one from the other for the purpose of illustration, the parts being shown in perspective.

In the drawings, 2 may designate the driving member of the assembly and 3 the driven member. The driven member 3 is keyed to or otherwise secured to a shaft 4. This shaft extends through the assembly, including the driving member 2. Where it projects through the driving member 2 it is shown as having a thrust bearing 5 thereon and a nut 6. The thrust bearing 5 and the nut 6 hold the assembly together. The hub of the driving member 2 is shown as being provided with a hollow coupling 9 on a shaft 10, but this is illustrated merely for the purpose of showing one means for imparting a back and forth movement or driving movement to the driving member 2.

Interposed between the hub of the driving member 2 and the hub of the driven member 3 is a sleeve 11 having an annular worm-gear 12 thereon and having a disk 13 spaced from the worm-wheel. This disk has a slightly elongated opening 14 therethrough. The sleeve 11 is loose on the shaft 4.

Interposed between the disk 13 and the driver 2 is a gear-wheel 15. A simple spur gear has been illustrated as showing the simplest embodiment of my invention.

The gear-wheel 15 has a bearing on the hub of the driver 2 and is free to rotate with respect to both the driver 2 and the sleeve 11.

Mounted on the driven member 3 so as to be entirely rigid is a fixed shaft or post 17, the outer end of the post being supported in a bracket 17' also carried on the member 3. This shaft or post provides a support for a sleeve 18 having a bevel gear 19 fixed at one end thereof and having a pinion 20 fixed at the other end thereof, the pinion 20 meshing with the gear-wheel 15. Carried on the inner face of the disk 3 in perpendicular relationship with the post 17 are a plurality of bearing members 21 that support a shaft 22. The shaft 22 is provided with a beveled pinion 23 that meshes with the beveled gear 19, the gear-wheel 23 being fixed on the shaft 22. Fixed on the shaft 22 is a worm 24 that meshes with the worm-wheel 12 on the sleeve 11.

Carried on the driving member 2 is a rigid post or pin 25. This pin projects through a slightly elongated opening 26 in the gear-wheel 15 and also projects through the opening 14 in the intermediate disk 13. By reference to Figure 2 it will be seen that the openings 14 and 26 are elongated in opposite directions from a common center through which the pin 25 passes so that the pin 25 bears against the left-hand end of the slot 14 in the disk 13 as viewed in Figure 2 and bears against the right-hand end of the slot 26 in the gear-wheel 15. Thus, if as viewed in Figure 2, the pin 25 moves in a clockwise direction, it tends to move along the slot 14 away from the end of the slot with which it contacts, but it tends to transmit motion to the intermediate gear 15. If, however, as viewed in Figure 2 the pin tends to move in a counterclockwise direction, it will impart movement directly to the disk 13 because it is at the left-hand end of the slot 14, but it will not tend to transmit motion to the gear-wheel 15 because its tendency is to move freely in the direction of the elongation of the slot 26.

The gearing is such that rotation of the gear-wheel 15 drives the pinion 20 which in turn operates the beveled gears 19 and 23 to rotate the shaft 22 which in turn drives the worm 24 to rotate the sleeve 11 on which the worm 12 is carried and which also carries the disk 13. The ratio of the gearing is such that for each revolution of the gear-wheel 15, the disk 13 will be rotated just exactly one revolution. For example, if there are 100 teeth on the periphery of the gear 15 and 10 teeth on the pinion 20, the bevel-gear will be turned 10 times for each revolution of the gear-wheel 15. Gears 19 and 23 are of 1:1 ratio so that the shaft 22 rotates 10 times for each revolution of the gear-wheel 15. The pitch of the worm-gears is such that 10 revolutions of the worm 24 will impart one complete revolution to the worm-wheel 12.

The operation of the mechanism may now be followed. Assume that the shaft 10 turns the driver 2 first in one direction and then in the other. When the driver 2 is turning in a counterclockwise direction as viewed in Figure 2, it is turning away from the abutment formed by the end of the slot 26 against which the rigid post 25 bears and tends to travel along the slot 26 without rotating the gear 15. The end of the post at this time is bearing against the end of the slot 14 in the disk 13, as will be clearly seen from an inspection of Figure 2, and it therefore rotates the disk 13 in a counterclockwise direction. The disk 13 carries the worm-wheel 12, and since the worm-gear is irreversible and can transmit motion in one direction only, all of the parts are locked together, and the driven member 3 and the shaft 4 are thus caused to move in a counterclockwise direction.

When the direction of the driver 2 is reversed, the pin 25 tends to move away from the end of the slot 14, and the disk 13 so that it does not impart rotational movement directly to the sleeve 11. It is, however, against the end of the slot 26 in the gear 15, and it tends to rotate this gear. As the gear 15 rotates, it drives the train of gearing including the beveled gears 19 and 23 and the worm-wheel 12, and it causes the disk 13 to rotate in the direction in which the pin 25 is moving at the same speed that the pin 25 is moving. Since the disk 13 is attached to the sleeve 11 and the sleeve 11 is loose on the shaft 4, the turning of the sleeve 11 does not transmit any motion to the shaft, and the turning of the disk 13 merely assures that the travel of the disk will just exactly keep up with the travel of the pin 25, and the relation of the slots 14 and 26 to each other will, therefore, always be the same as shown in Figure 2. In other words, when the pin 25 on the driver is moving in a counterclockwise direction as viewed in Figure 2, it is tending to rotate the disk 13 in a counterclockwise direction and to move along the slot 26. It cannot move along the slot 26, however, because the worms 12 and 24 constitute a positive lock against relative movement of any of the parts when the driver is turning in the counterclockwise direction. When the driver is turning in a clockwise direction, the pin 25 tends to move along the slot 14, but it cannot because the slot is rotated through the train of gearing at the same speed that the pin is moving. While the pin always tends, therefore, to travel along one slot or the other, it can never do so except to the very slight extent to which the back-lash in the gears would permit if the gears were not accurately formed.

Thus, in the device as described, the parts are always in fixed driving relation, and the driver is always permanently geared to the driven member. The one-way motion is secured through the fact that the worm-gearing will not transmit motion in one direction, being a unidirectional gearing, and that in the opposite direction the operation of the gears merely causes an idle movement that is not transmitted to the driven member. The invention is further operable by reason of the fact that the disk 13 is driven at the same speed and in the same direction as the driver 2 when the driver 2 is moving in the idle direction so that the relation between the motion-transmitting pin 25 and the slot 14 in the disk always remains the same.

In the foregoing description I have assumed the member 2 to be the driver and the member 3 to be the driven member, but this may be reversed with the member 3 acting as the driver and the member 2 being the driven member. I have also shown only the simplest embodiment of my invention wherein motion of the member 2 is transmitted to the shaft 4 in one direction only, but by duplicating the unit and the use of appropriate gearing as will be readily understood by those skilled in the art, the oscillating motion of the member 2 may be transmitted in both directions to the shaft 4. Also, the device may be used in any other place where a ratchet mechanism is employed as for example, in the case of an over-running drive where the member 2 normally transmits power to the member 3, but the member 3 may at times go faster than the member 2. The mechanism is also applicable to use with variable speed drives because of the infinite range of motion which it will transmit in one direction. Whether the driver 2, for example, rotates only 2° or 360° or more in one direction, the same degree of movement will be transmitted to the driven member 3 and the shaft 4. Various other applications of the mechanism will appear to those skilled in the art and need not be specifically referred to herein.

While I have illustrated and described one complete mechanism embodying my invention, it will be understood that the construction and the arrangement of the parts may be varied within the contemplation of my invention, and various changes may be made in the construction within the principles herein disclosed and under the scope of the following claims.

I claim as my invention:

1. A mechanical movement for transmitting rotary motion in one direction only, comprising a driving member, a driven member, an intermediate member, an irreversible train of gears for driving the intermediate member only when the driving member is moving in one direction and which transmits motion directly to the driven member when the driving member rotates in the opposite direction.

2. A mechanical movement of the class described comprising a driving member, a driven member, an intermediate member rotatable relatively to the driven member, and an irreversible train of gears for transmitting motion from the driving member to the intermediate member in one direction only and for transmitting motion from the driver directly to the driven member when the driver rotates in the other direction only.

3. A mechanical movement for transmitting rotary motion in one direction only comprising a driving member having a projection thereon, a driven member, an intermediate member having a worm-wheel thereon, a worm-gear mounted on the driven member engaging the worm-wheel of the intermediate member, means on the intermediate member providing an abutment against which said projection engages for transmitting motion in one direction only from the driving member to the intermediate member, and through said worm-gear to the driven member, a gear-wheel, means on the gear-wheel providing an abutment for engagement with said projection on the driving member and arranged to transmit motion from the driving member to the gear-wheel in a direction only reverse to that in which the projection transmits movement to the intermediate member, and a train of gears continuously meshed with said gear-wheel for operating said worm, said gears having a ratio such that the intermediate member is rotated at the same speed and in the same direction that the gear-wheel is rotated.

4. A mechanical movement having two members, one being the driving and one being a driven member, a worm-gear on one of said two members, an intermediate member engaged by the worm-gear, cooperating abutments on the intermediate member and the other of said two members for transmitting motion in one direction only, a train of gears for operating said worm, and a driving connection for transmitting motion from said other of the two members to the train of gears in one direction only and reversely to that in which it transmits motion to the intermediate member.

5. A mechanical movement having driving and driven members and means comprising an irreversible train of gears operatively interposed between the two members and permanently in mesh between the two members, there being an intermediate member driven by the gearing upon motion of the driving member in one direction only, there being means on the driving and intermediate members for transmitting motion directly from the driving to the intermediate member upon rotation of the driven member in the other direction whereby the intermediate member is driven idly upon rotation of the driver in one direction and is utilized to transmit motion to the driven member when the driver rotates in the other direction, the irreversible train of gears enabling such transmission of motion to the driven member.

6. A mechanical movement comprising a shaft, a driven member fixed on the shaft, an intermediate member rotatable about the shaft, a gear-wheel rotatable about the shaft, a driving member rotatable about the shaft, a worm-wheel on the intermediate member, a worm-gear supported on the driven member, a train of gears for transmitting motion from the gear-wheel to the worm-gear at a speed such that the intermediate member may be rotated at the same speed as the gear-wheel, means on the intermediate member and gear-wheel providing oppositely faced abutments, and a projection on the driver engaging said oppositely faced abutments whereby the driver serves to transmit motion directly to the intermediate member in one direction and directly to the gear-wheel in the opposite direction.

7. A motion-transmitting coupling of the class described comprising axially alined driving and driven members, a gear-wheel concentric with said two members, an intermediate member concentric with said two members, the gear-wheel and intermediate member having oppositely faced abutments thereon, a projection on one of said first two members simultaneously engaging both of said abutments for transmitting motion directly from said member to the intermediate member in one direction and the gear-wheel in the other direction, and an irreversible train of gears mounted on the other of said first two members driven by said gear-wheel and arranged to drive the intermediate member whereby all of the parts rotate as a unit when the driver is imparting rotation to the intermediate member and whereby the intermediate member is driven as an idle element when the driver imparts motion to the gear-wheel.

8. A mechanical movement of the class described comprising cooperating driving and driven members and an intermediate member operatively disposed between the two, cooperating abutments on the driver and intermediate members for transmitting motion directly from one to the other, a train of gearing including a worm-gear connecting the three members to interlock the members when motion is being transmitted through the driver to the intermediate member by means of the abutments and for rotating the intermediate member relatively to the driven member and at the same speed as the driver and in the same direction when the direction of rotation of the driver is reversed.

9. A mechanical movement for transmitting rotary motion in one direction only comprising a driving member, a driven member and an interconnecting irreversible train of gears including a worm-wheel which drives the worm-wheel only when the driving member is rotating in one direction, and which transmits motion directly to the driven member when the driving member is rotating in the opposite direction.

10. A mechanical movement for transmitting rotary motion in one direction only comprising a driving member, a driven member, an irreversible train of gears comprising a worm-wheel, a worm-gear meshing with the worm-wheel and carried by one of said two members, and means for transmitting power to the driven member through the worm-gearing when the driving member rotates in one direction and for driving the worm-wheel idly when the driver rotates in the other direction.

ROBERT LLOYD BARRISH.